Patented Sept. 25, 1951

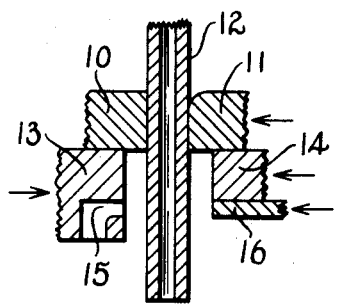
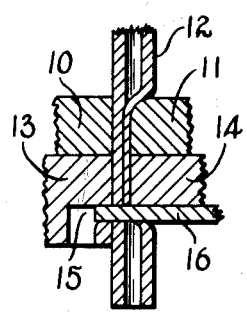
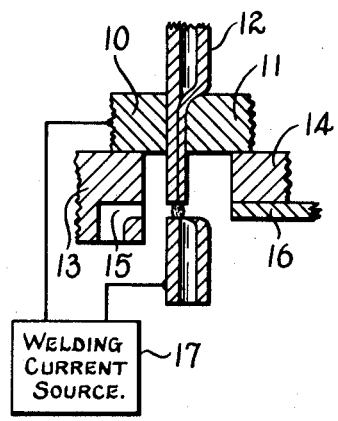
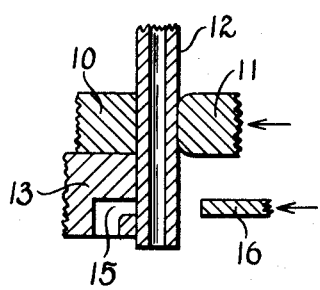
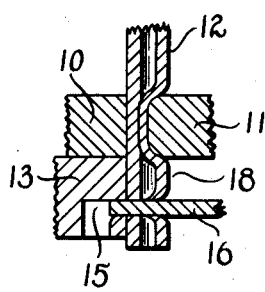
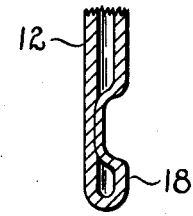

2,568,911

UNITED STATES PATENT OFFICE 2,568,911

METHOD OF SEVERING AND END SEALING A TUBE

Irvin W. Cox, West Allis, and Lester D. Drugmand, Greenfield, Wis., assignors to Cutler-Hammer, Inc., Milwaukee, Wis., a corporation of Delaware Application August 4, 1948, Serial No. 42,384

1 Claim. (Cl. 29—148.2)

This invention relates to a method of severing and end sealing a tube.

Where a vessel is to be exhausted or filled with a gas or vapor it is common practice to connect thereto a metal tube through which exhaustion or filling is effected and the severing and sealing of such a tube has presented difficulties. While various methods of cutting and sealing such tubes have heretofore been proposed they either have been too complicated or have failed to afford the desired protection against entrance of air in the case of exhausted vessels or contamination of the contents of gas, vapor or liquid filled vessels.

An object of the invention is to provide for severing and sealing tubes employed for the aforesaid and other purposes in a very simple and expeditious manner with all necessary protection against the aforementioned entrance of air or contamination of contents.

Another object is to provide a method of severing and sealing which may be carried out by very simple means.

Other objects and advantages of the invention will hereinafter appear.

The accompanying drawing illustrates schematically means for severing and sealing in different ways in accordance with the invention.

In the drawing,

Figs. 1, 2 and 3 are exemplary of one method, and

Figs. 4, 5 and 6 are exemplary of a second method.

Referring to Fig. 1, it shows a stationary block 10 and a movable jaw 11 between which is inserted a tube 12 to be severed and sealed. The jaw 11 is movable as indicated by an arrow toward the block 10 transversely of the tube 12. Below said block and said jaw and preferably contiguous thereto respectively are movable jaws 13 and 14 spaced from the tube 12 but movable toward the latter as indicated by arrows. The jaw 13 is shown as provided with an open recess 15 to receive the end of a movable cutoff knife 16 arranged below the jaw 14 and preferably contiguous thereto, said knife being movable towards tube 12 as indicated by an arrow.

The method of severing and sealing afforded by such means is as follows, it being assumed that the parts are in the relation shown in Fig. 1. First the tube 12 is flattened as shown in Fig. 2 by moving the jaw 11 toward block 10 and moving the jaws 13 and 14 together, these operations being performed simultaneously or sequentially, as preferred. Thus with the block and jaws suitably formed the same will under the pressure applied to the movable jaws effect plastic deformation of the tube to close and effectively seal the passage therebetween at least while the jaw 11 remains under pressure. Then as the next step the knife 16 is driven through the tube at the lower extremity of its flattened portion to sever said tube, as is also shown in Fig. 2. Then as shown in Fig. 3 the knife and jaws 13 and 14 are retracted, leaving a flattened end portion of the tube projecting from the block 10 and jaw 11 for a more permanent seal thereof in any desired manner. However, it is preferred to seal by welding, and this can be done conveniently by holding the cutoff or isolated piece of tube in spaced relation to the clamped severed end of the tube and producing a welding arc therebetween as depicted in Fig. 3. This only requires connection between the block 10 or jaw 11 and the cutoff or isolated piece of tube, of any desired device 17 for supplying welding current and after welding is completed the tube may be removed from the grip of block 10 and jaw 11.

As will be apparent, the provision of a projecting flattened tube end through use of the retracting jaws 13 and 14 provides for removal of the welding arc from the tube clamping parts, as well as increasing the distance between the welding arc and the exhausted or filled portion of the tube, both being desirable. Also as will be apparent, this method of severing and sealing effectively closes the tube end down to its tip, and it thus becomes less important that the seal effected by flattening of the tube remains intact when the tube is relieved of flattening pressure or constricting force.

Where the seal resulting from flattening can be relied upon for permanence after welding and discontinuance of flattening pressure or where precaution against entry into the tube of a slight amount of air or impurities is not important then the method exemplified in Figs. 4, 5 and 6 will be quite satisfactory. Here the jaw 14 is omitted, the remaining elements being the like corresponding elements of Figs. 1 to 3 and being used in a similar manner. As the result of omission of jaw 14 the end 18 of the tube projecting from the block 10 and jaw 11 is not flattened to the degree aforedescribed but instead it assumes a bead form roughly depicted in Figs. 5 and 6. This bead extremity may, however, be readily sealed in various ways, as by welding in the manner aforedescribed, and in the severing of the tube the bulge is fairly well sealed pending welding. In any event the pocket within the bead may be kept small, and thus the tube is protected against any substantial impairment even if the flattened portion of the tube when relieved of pressure allows communication between the pocket and the vacuated or filled portion of the tube. While in Fig. 4 the jaw 13 is retractable it need not be retractable, assuming sealing in a manner rendering close proximity to the tube unobjectionable.

What we claim as new and desire to secure by Letters Patent is:

The method of severing and end sealing a tube which comprises closing said tube adjacent the severing point by applying a sustained constricting force thereon, then severing the tube, then end sealing the tube by establishing a welding arc between its end and the cutoff portion of the tube, and then terminating the constricting force applied to the tube.

IRVIN W. COX.
LESTER D. DRUGMAND.

REFERENCES CITED

The following references are of record in the file of this patent:

UNITED STATES PATENTS

| Number | Name | Date |
| --- | --- | --- |
| 2,132,071 | Johnson | Oct. 4, 1933 |
| 2,174,906 | Wagner | Oct. 3, 1939 |
| 2,213,317 | Lathrop | Sept. 3, 1940 |
| 2,376,185 | Randall | May 15, 1945 |